(12) United States Patent
Murakowski et al.

(10) Patent No.: US 9,544,510 B2
(45) Date of Patent: Jan. 10, 2017

(54) THREE-DIMENSIONAL RECONSTRUCTION OF A MILLIMETER-WAVE SCENE BY OPTICAL UP-CONVERSION AND CROSS-CORRELATION DETECTION

(71) Applicant: Phase Sensitive Innovations, Inc., Newark, DE (US)

(72) Inventors: Janusz Murakowski, Bear, DE (US); Garrett Schneider, New Castle, DE (US); Shouyuan Shi, Newark, DE (US); Christopher A. Schuetz, Avondale, PA (US); Dennis W. Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 285 days.

(21) Appl. No.: 14/150,213

(22) Filed: Jan. 8, 2014

(65) Prior Publication Data

US 2014/0192161 A1    Jul. 10, 2014

Related U.S. Application Data

(60) Provisional application No. 61/750,865, filed on Jan. 10, 2013.

(51) Int. Cl.
*G02F 1/035* (2006.01)
*H04N 5/30* (2006.01)
*G01B 15/04* (2006.01)

(52) U.S. Cl.
CPC ............... *H04N 5/30* (2013.01); *G01B 15/04* (2013.01)

(58) Field of Classification Search
CPC ..................... G01B 15/04; H04N 5/30
See application file for complete search history.

(56) References Cited

U.S. PATENT DOCUMENTS

| 4,748,686 | A  | * | 5/1988  | Glomb ............... G01D 5/268 324/96 |
| 6,777,684 | B1 | * | 8/2004  | Volkov .............. G01N 21/3581 250/341.1 |
| 7,187,492 | B1 | * | 3/2007  | Shay ................. H01S 3/2383 342/371 |
| 7,436,588 | B2 | * | 10/2008 | Rothenberg ....... B23K 26/0604 359/349 |
| 7,903,257 | B2 | * | 3/2011  | de Boer ............. A61B 5/0059 356/456 |
| 7,965,435 | B2 | * | 6/2011  | Schuetz ............. G01S 13/89 359/279 |
| 8,159,737 | B2 | * | 4/2012  | Martin .............. G01S 13/89 359/239 |
| 8,223,128 | B1 | * | 7/2012  | Edwards ............ G06F 3/0202 345/170 |

* cited by examiner

*Primary Examiner* — Sung Pak
(74) *Attorney, Agent, or Firm* — Panitch Schwarze Belisario & Nadel LLP

(57) ABSTRACT

An apparatus and method may be used to create images, e.g., three-dimensional images, based on received radio-frequency (RF), e.g., millimeter wave, signals carrying image data. The RF signals may be modulated onto optical carrier signals, and the resulting modulated optical signals may be cross-correlated. The resulting cross-correlations may be used to extract image data that may be used to generate three-dimensional images.

31 Claims, 8 Drawing Sheets

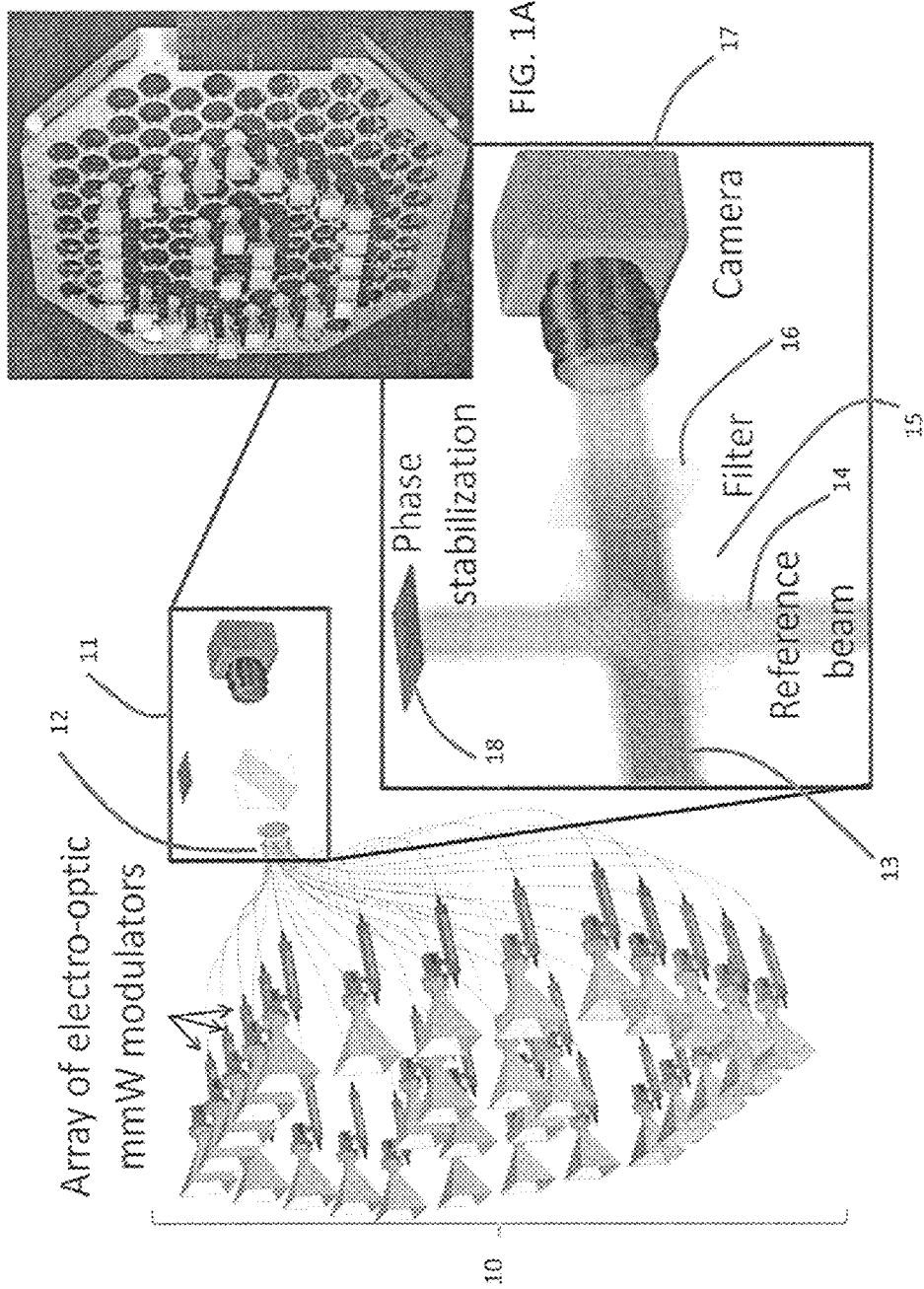

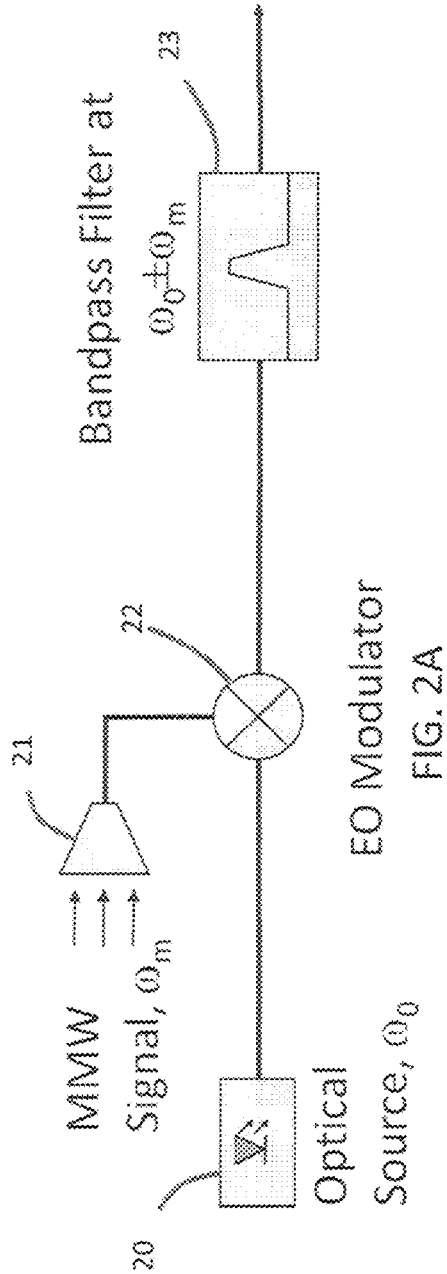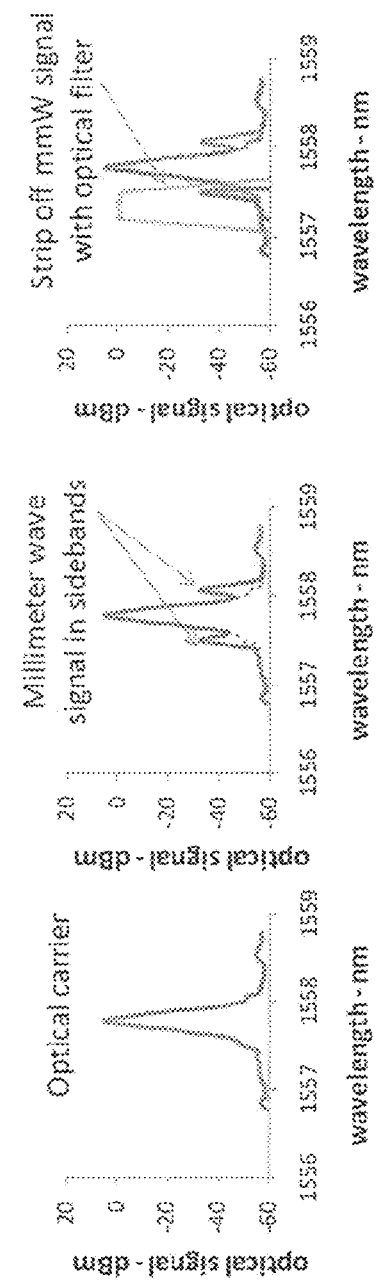
FIG. 2A EO Modulator
FIG. 2B
FIG. 2C
FIG. 2D 100-antenna array
450λ away from aperture 50-antenna array
450λ away from aperture 29-antenna array
450λ away from aperture 100-antenna array
900λ away from aperture 50-antenna array
900λ away from aperture 29-antenna array
900λ away from aperture

THREE-DIMENSIONAL RECONSTRUCTION OF A MILLIMETER-WAVE SCENE BY OPTICAL UP-CONVERSION AND CROSS-CORRELATION DETECTION

CROSS-REFERENCE TO RELATED APPLICATION

The present application claims priority to U.S. Provisional Patent Application No. 61/750,865, filed on Jan. 10, 2013, and incorporated herein by reference in its entirety.

BACKGROUND

In existing approaches to millimeter wave (mmW) based imaging, an array of optical fibers carrying the up-converted mmW signal may be arranged to mimic an array of antennas capturing the mmW radiation from the scene. The optical beams from the fibers may then be allowed to propagate in free space, and interfere to form an optical image corresponding to the mmW scene on a CCD array. Ideally, each pixel of the CCD receives optical beams from all the fibers. The drawback to this approach is that it does not readily provide a way to obtain three-dimensional (3D) images.

SUMMARY OF VARIOUS EMBODIMENTS

Embodiments of the invention may include a device and associated method for three-dimensional imaging of a millimeter-wave (mmW) scene that may use sparse-aperture capture of the radiation, its up-conversion to optical domain, optical measurement of cross-correlation terms, and digital reconstruction of the original mmW scene from the cross-correlation terms.

BRIEF DESCRIPTION OF THE DRAWINGS

Various embodiments of the invention will now be described in conjunction with the accompanying drawings, in which:

FIGS. 1 and 1A show an overview of an example of a distributed-aperture mmW imaging system;

FIGS. 2A-2D show and describe the concept of optical up-conversion of a signal;

DETAILED DESCRIPTION

Figure 3:
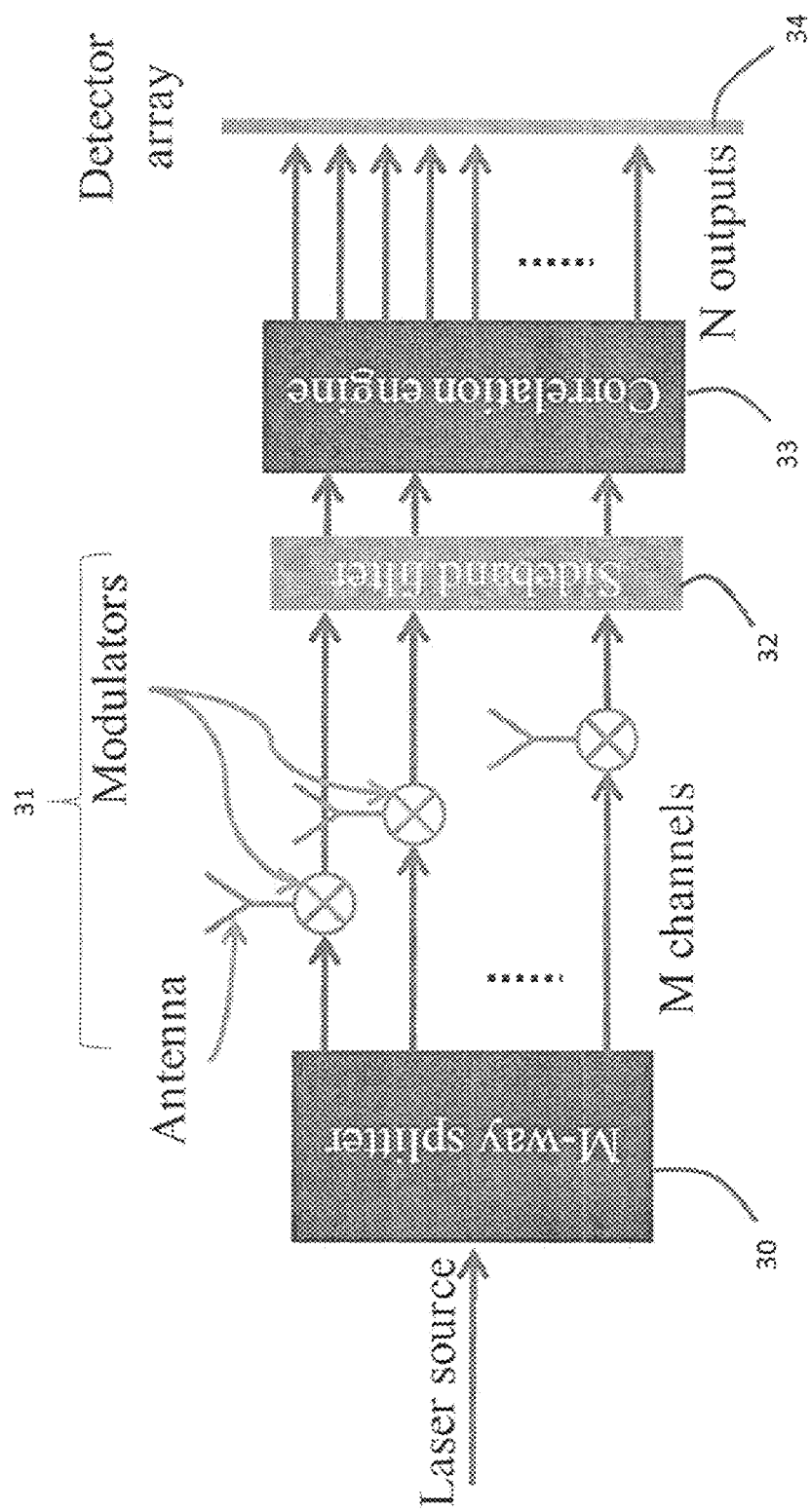
FIG. 3 shows an example diagram of the optical layer of an imaging system.

As noted above, in prior arrangements for mmW imaging, optical beams from the various fibers carrying upconverted mmW signals may be allowed to propagate in free space, and may interfere to form an optical image corresponding to the mmW scene on a CCD array. In contrast, in embodiments of the present invention, the beams from the fibers may be allowed to interfere only pairwise; that is, each detector may receive beams from as few as two fibers. As a result, the intensities measured by individual detectors do not correspond directly to the mmW intensities of the scene as in the conventional configuration. Instead, the mmW scene may be reconstructed, digitally from the measured intensities. This may permit recovery of 3D information.

We begin here by describing sparse-aperture millimeter-wave imaging based on optical upconversion in some detail to lay the groundwork for the system improvement that is the subject of embodiments of this invention. FIG. 1 shows an overview of an example of a distributed-aperture mmW system. Millimeter-wave radiation originating at the scene may be captured by a sparsely distributed array of antennas 10 (see, also, FIG. 1A), 21 (see FIG. 2A), which may couple their detected radiation to respective electro-optic (EO) modulators 22, as shown in FIG. 2A. An EO modulator 22 may convert the RF energy to the optical domain. It may do so by modulating an optical beam (see FIG. 2B) produced by an optical source 20, such as, but not limited to, a laser. The time-variant modulation may manifest itself in the frequency domain as a set of sidebands flanking the original carrier frequency (or wavelength), at which the optical source operates, an example of which is shown in FIG. 2C. As a result, the RF energy radiated in the mmW domain may appear in the optical domain as sidebands of the carrier frequency. This up-conversion of the mmW signal into the optical domain may be coherent in the sense that all the phase and amplitude information present in the mmW is preserved in the optical sidebands. This property of coherence preservation in optical up-conversion may allow the recovery of the mmW image using optical means.

Returning to FIG. 1, the optical beams containing the laser carrier wavelength and the sidebands with imprinted mmW signal may be conveyed by optical fibers to a lenslet array 12 that may mimic the array of the RF antennas, at a reduced scale. The lenslet array 12 and other components may be part of an optical processing unit 11. Following lenslet array 12, the beams may propagate in free space, no longer guided by optical fibers. The propagation of the individual beams in free space, where they may overlap to form a large combined beam 13, may allow the individual beams to interfere with one another. Part of the combined beam 13 may be split off, e.g., using a splitter 15, combined with a reference beam 14, and sent to an array of detectors 18, in order to detect, and allow for the compensation of, optical phase variation originating in the individual fibers due to environmental conditions, such as vibrations and acoustics. This may ensure that the resulting image comes from the mmW scene as opposed to vibrating fibers. A band-pass optical filter, 16 in FIG. 1 or 23 in FIG. 2A, may be used to strip off the carrier wavelength and may allow only one of the sidebands to pass through, e.g., as shown in FIG. 2D. The overlapping beams that now carry only a single sideband may be projected onto a charge-coupled device (CCD) array 17 (shown as a "Camera" in FIG. 1), where they may interfere to form a representation of the mmW image in the optical domain. In other words, the optical image formed by the overlapping beams may correspond to a replica of a mmW image as seen by the sparse aperture of the antenna array.

As described above, the mmW image may be reconstructed directly on the CCD array 17 by the interference of light emanating from individual fibers. As such, the imaging may be limited to a two-dimensional reconstruction of the mmW scene, just as a point-end-shoot camera captures only a two-dimensional representation of a three-dimensional world. Yet, the fibers may generally carry all information available to the sparse aperture—including the depth information of the scene. This information is encoded in cross-correlations between the individual channels. To access this information, cross-correlations between channels may be measured as shown in the example embodiments of the present invention.

To aid in elucidating the concepts of various embodiments of the invention, a configuration of an imaging system with an emphasis on the optical layer is presented in FIG. 3. A single laser source may be split M ways 30, and the beams may be routed through modulators coupled to antennas capturing the mmW radiation 31. The (optical) outputs of the modulators may be filtered 32 to allow only a single sideband corresponding to the captured mmW radiation to pass. The correlation engine 33 may then allow the interference of the optical beams among the different channels, and the result of the interference may be measured with an array of detectors 34.

In abstract mathematical terms, the mmW imager may be thought of as corresponding to a linear operator from the scene to the detector array. An arbitrary mmW scene can be represented as a vector of mmW intensities emanating from each point of the considered volume. Similarly, the intensities detected by the detectors in the array can be arranged in a vector. The imager may serve to convert the mmW (emission) intensities to optical intensities that may be detected by the elements of the detector array. This "conversion" may be a linear process in the sense of a linear operation from the (linear) space of all possible mmW scenes to the (linear) space of all possible optical detections. The linear operator corresponding to this conversion process may depend on the details of the imager design—in particular, it may depend on the antenna configuration and on the chosen optical correlation engine. Under some circumstances, an (approximate) inverse of this operator can be found, which may allow the reconstruction of the full mmW scene from the measured optical intensities.

In the context of some embodiments of the present invention, this operator may be explicitly calculated for the case of an arbitrary sparse-aperture antenna array and a pairwise cross-correlation, engine. In this case, every pair of the M channels may be routed through a 50/50 beam splitter, and two intensities may be measured, as reflected in FIG. 4.

The following is an example of mathematical analysis to illustrate how the 3D mmW scene may be recovered from pairwise cross-correlations. It is noted that, as stated in general terms above, the concepts discussed here can also be readily applied to the case where more than two beams are allowed to interfere at any given detector (i.e., cross-correlations among more than two beams). Therefore, the analysis for mmW image recovery from pairwise cross-correlations presented below should be construed as an illustrative example rather than limiting the scope of the invention.

The time variation of the electric field in an optical fiber before the modulator may generally correspond to monochromatic radiation and may thus be expressed as $$\frac{1}{\sqrt{2}} B_m e^{i\omega t} + c.c., \quad (1)$$

where $B_m$ is the amplitude of the optical field in the m-th channel, $\omega$ is the optical frequency, and c.c. signifies the presence of the complex-conjugate term as required to make expression (1) real. The modulation with the mmW radiation captured from the scene may modify (1) by introducing an extra phase $\phi_m$, which may result in the following time-variable electric field:

$$A_m = \frac{1}{\sqrt{2}} B_m e^{i(\omega t + \varphi_m)} + c.c. \quad (2)$$

Phase $\phi_m$ may generally be time-dependent. It may also depend on the placement of the particular antenna in the array, and/or on the intensities of the sources. Assuming that the scene consists of a discrete set of monochromatic mmW sources, the phase $\phi_m$ may be written in the form $$\varphi_m = \sum_k \frac{S_k}{r_{km}} \cos(\Omega t + \phi_{km}), \quad (3)$$

where k enumerates the mmW sources, $S_k$ is the amplitude of radiation at the k-th source sealed by the antenna gain and by the modulation efficiency of the modulator, $r_{km}$ is the distance between the k-th source and the m-th antenna, $\Omega$ is the frequency of the mmW radiation, and $\phi_{km}$ is a phase that the mmW radiation may pick up on the way from the source to the antenna (which is $=r_{km}\Omega/c$ for free-space propagation).

Figure 4:
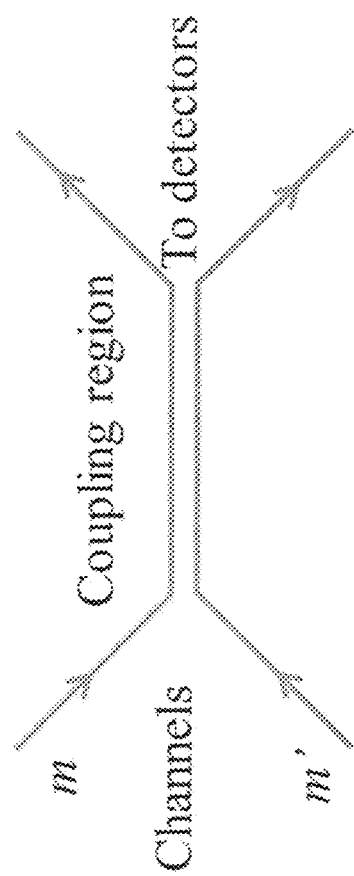
FIG. 4 shows an example of a beam splitter that may be used in some implementations.

Assuming that the mmW sources in the scene are uncorrelated, as may be typical for passive imaging, the power detected at the outputs of the 50/50 splitters in FIG. 4 may be found as $$P_{mm'} = \frac{1}{8M} \sum_k S_k^2 \left[ \frac{B_m^2}{r_{km}^2} + \frac{B_{m'}^2}{r_{km'}^2} - 2\frac{B_{km} B_{km'}}{r_{km} r_{km'}} \sin(\phi_{km} - \phi_{km'}) \right], \quad (4)$$

which shows that the detected optical power $P_{mm'}$ is related by a linear operation to the mmW power emitted by the scene $S_k^2$. Inverting this relation may allow digital reconstruction of the full 3D mmW scene from the measured cross-correlation terms.

Figure 5:
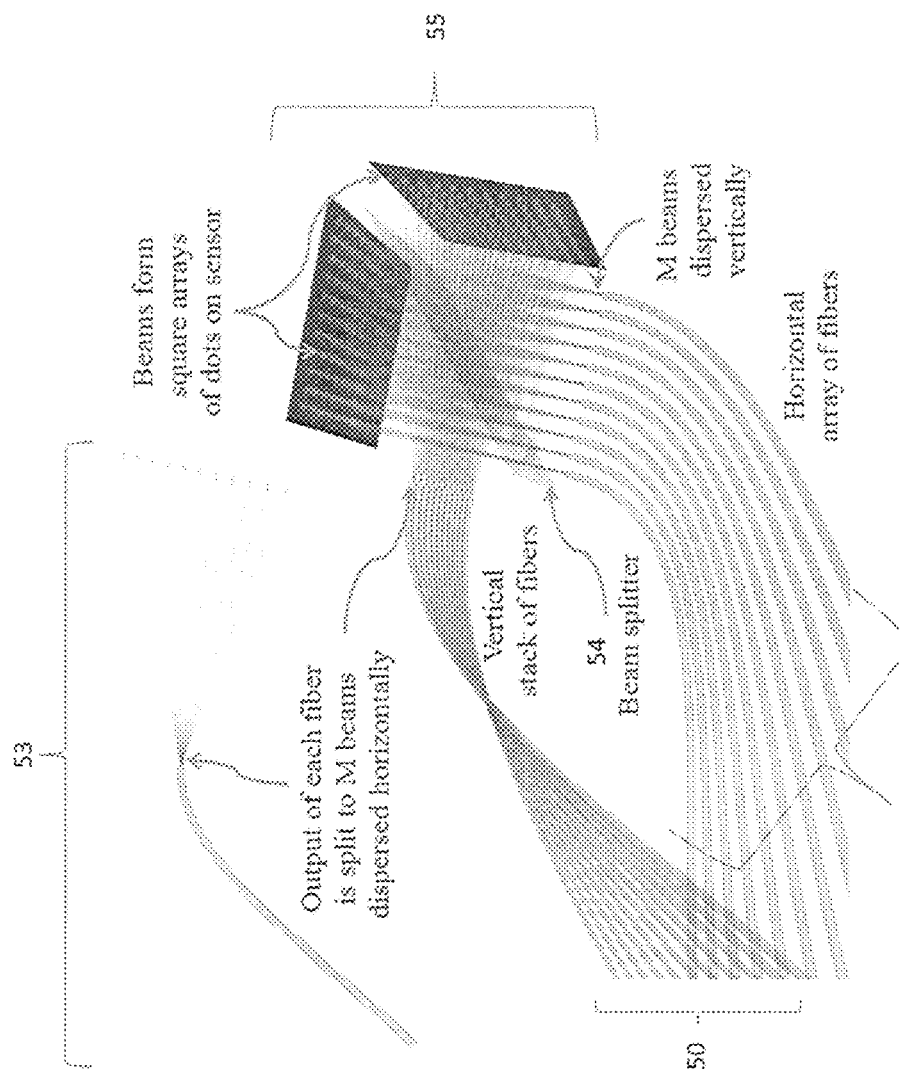
FIG. 5 shows, conceptually, an example of measurement of cross-correlations in the optical domain.

Stated another way, the entire mmW scene (defined by terms $S_k^2$) can be, in principle, reconstructed from the measurement of cross-correlation terms $P_{mm'}$, as long as there is a sufficient number of antennas distributed throughout the aperture. With M channels, there are $$\frac{(M-1)M}{2} \quad (5)$$

pairs and, correspondingly, (M−1)M measurements to be made for the cross-correlations. For a large number of channels, using a 50/50 beam splitter as in FIG. 4 for each pair may become cumbersome. As an alternative, a somewhat integrated approach may be used instead. An example of such an integrated approach is illustrated in FIG. 5, where first the beam carried by each fiber carrying a modulated optical signal may be split into two 50, 51, and then the output of each fiber may be split M ways 53. The fibers in each of the two bundles may be arranged in a linear array in such a way as to produce a square array of free-propagating beams. The square arrays may then be combined using a beam splitter/combiner 54 to yield two square arrays of spots 55, where each spot may represent a combination of two beams carried in two channels. Alternatively, the beam splitting and combining may be achieved in free space, or dielectric medium, starting with a single, for example, linear, array of fibers, and using optical elements known in the art, including, e.g., but not limited to, (free-space) splitter/combiners, mirrors, lenses, and/or wave-plates.

In order to ensure proper interference at the detector array(s), the polarization of the component, and combined beams may be managed using, for example, means that may include polarizers, beam splitters/combiners, wave-plates, and/or polarization rotators.

Embodiments of the present invention may provide the unique ability to fully reconstruct a three-dimensional mmW scene without the use of active illumination—i.e., by using only passive imaging and relying on the natural radiation of millimeter waves by objects at terrestrial temperatures. As such, embodiments of the invention can be applied to improve the imaging capabilities of mmW imagers based on sparse-aperture and optical up-conversion.

Numerical simulations have been carried out that confirm the validity of the approach. In order to verify the approach presented above, a series of computational experiments were performed in which a certain antenna configuration was assumed and was presented with a simple geometrical pattern of mmW emission. Cross-correlation terms were then computed using Eq. (1), and the simulations computationally reversed the relation to see what a recovered scene would look like.

In this preliminary study, the size of the computational space was kept to a minimum. Also, for ease of visualizations the dimension of the imaged space was reduced from three to two. To this end, the two transverse dimensions were collapsed to one, and the depth dimension was maintained in order to test the ability of the system to recover the scene in this dimension.

Figure 6:
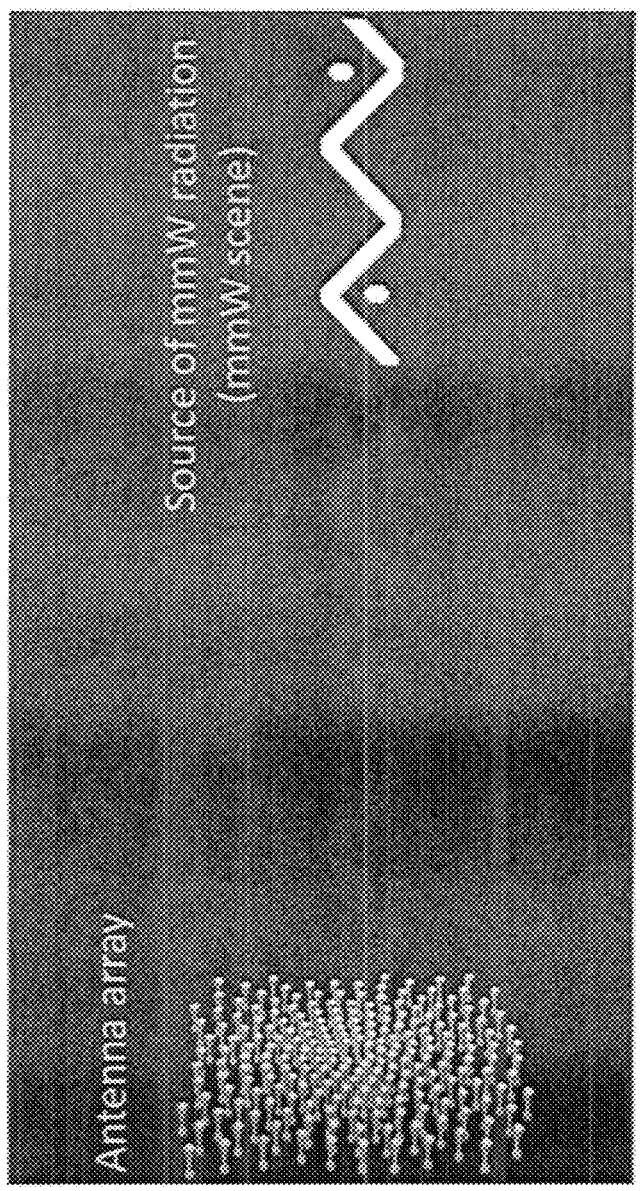
FIG. 6 shows a schematic depiction of a scene used in simulations.
Figure 7A:
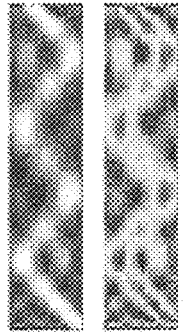
FIGS. 7A-7F show various results of simulations of systems according to aspects of this disclosure.
Figure 7B:
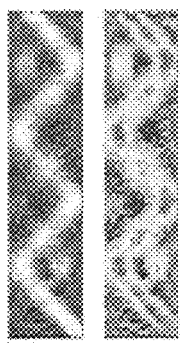
Figure 7C:
Figure 7D:
Figure 7E:
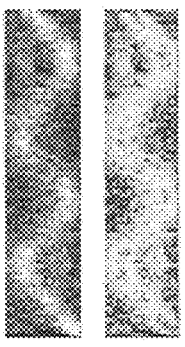
Figure 7F:
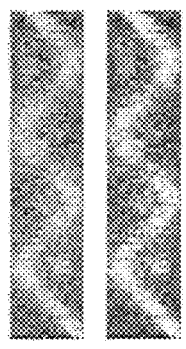

Schematically, the scene set-up was as shown in FIG. 6. FIG. 6 shows an antenna array (shown here as a two-dimensional (2D) array; a one-dimensional (1D) array was used in simulations), on the left, and a simple geometrical pattern of a mmW source, on the right. The rest of the scene was non-emitting, and is shown as black. The choice of the mmW scene and of the radiation pattern was dictated by the desire of simplicity on the one hand, and by the need to extract useful information from the tests, on the other hand.

For the simulations, two different distances of the object from the aperture were used, along with three different populations of the antenna array. Also, given that the problem being simulated is scale-invariant, the dimensions were expressed in terms of the wavelength $\lambda$ of the mmW radiation used for imaging. The aperture was $154\lambda$ across, and the distance from the aperture to the nearest part of the object was $450\lambda$ or $900\lambda$ for the two tests. The imaged object was $124.5\lambda$ high and $28.5\lambda$ deep.

FIGS. 7A-7F show the results of the simulated scene reconstruction. The images shown in FIGS. 7A-7F corroborate the analytical findings and demonstrate that the depth information of a mmW scene can be recovered computationally from cross-correlation terms. The images also provide some insight as to which system parameters may play an important role in the quality of the recovered image. The fidelity of the recovery may depend on the number of antennas used in the array. However, the effect of the antenna number may be considerably more pronounced for objects lying closer to the aperture than those farther away. Also, in general, the image quality may improve for objects closer to the aperture.

Figure 8:
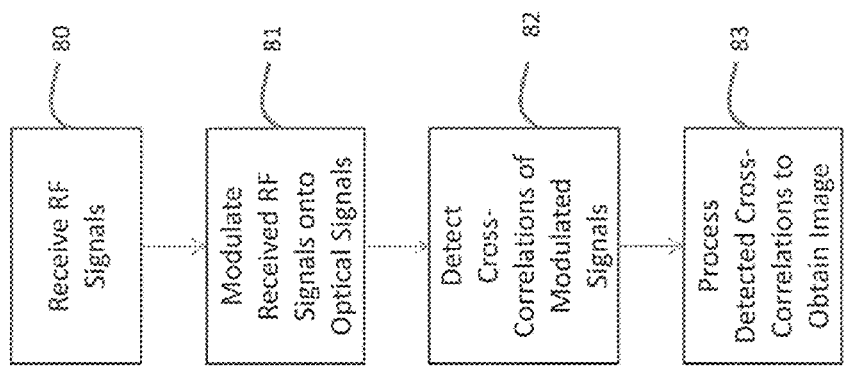
FIG. 8 shows an example flow diagram illustrating the incorporation of various aspects of this disclosure.

FIG. 8 shows an example flow-chart of a method that incorporates some of the above-described concepts. Received RF signals 80 may be modulated onto optical signals 81. Cross-correlations of the resulting modulated optical signals may then be detected 82 in the optical domain. Finally, the detected cross-correlations may be processed to obtain a reconstructed image that may correspond to image data carried by the received RF signals 83.

It is noted that a processing device to implement the processing 83 may be integrated with detectors shown and described above or may be implemented as a separate processing device. Such a processing device may include a computer or other general-purpose or application-specific processing hardware, which, particularly in the case of general-purpose processing hardware, may be programmed with appropriate software as needed to perform the processing. Application-specific processing hardware may be implemented in many forms, for example, but not limited to, application-specific integrated circuits (ASICs), programmable logic devices (PLDs), programmable logic arrays (PLAs), etc.

It will be appreciated by persons skilled in the art that the present invention is not limited by what has been particularly shown and described hereinabove. Rather the scope of the present invention includes both combinations an sub-combinations of various features described hereinabove as well as modifications and variations which would occur to persons skilled in the art upon reading the foregoing description and which are not in the prior art.

We claim:

1. A method of imaging, including:
    receiving radio-frequency (RF) radiation from a scene with a plurality of antennas arranged in a first pattern to generate a plurality of RF signals bearing image information;
    modulating the plurality of RF signals bearing image information onto a corresponding plurality of optical signals to obtain a corresponding plurality of modulated optical signals;
    conveying the plurality of modulated optical signals to an optical correlation engine configured to produce interference among the modulated optical signals;
    optically measuring cross-correlations among the modulated optical signals by detecting the interference with a plurality of photo-detectors;
    computationally processing the measured cross-correlations to generate an image.

2. The method of claim 1, wherein each of the plurality of photo-detectors measures a corresponding light intensity impinging upon it, to thus generate a plurality of measured light intensities; wherein the receiving RF radiation, the modulating, the conveying, and the optically measuring cross-correlations comprise a substantially linear operation from the scene to the plurality of measured light intensities; and wherein the computationally processing the measured cross-correlations includes approximately inverting the substantially linear operation.

3. The method of claim 1, wherein the receiving RF radiation, the modulating, the conveying, and the optically measuring cross-correlations comprise a substantially linear operation from the scene to the plurality of measured cross-correlations; and wherein the computationally processing the measured cross-correlations includes approximately inverting the substantially linear operation.

4. The method of claim 1, wherein the computationally processing the measured cross-correlations includes recovering depth information in the scene.

5. The method of claim 1, wherein
- each of the plurality of photo-detectors is configured to measure corresponding light intensity impinging upon it; and
- two or more of the modulated optical signals impinge substantially on each of the plurality of photo-detectors, whereby the optically measuring cross-correlations among the modulated optical signals includes detecting interferences between two or more of the modulated optical signals at each of the plurality of photo-detectors.

6. The method of claim 5, wherein the two or more of the modulated optical signals are exactly two of the modulated optical signals.

7. The method of claim 1, wherein the optically measuring cross-correlations among the modulated optical signals includes:
- passing respective pairs of the plurality of modulated optical signals through one or more 50/50 beam splitters to generate splitter output signals; and
- measuring intensities of the splitter output signals corresponding to a respective pair of the plurality of modulated optical signals, which comprise the interference between the pair of modulated optical signals, to obtain cross-correlation information about the respective pair of the plurality of modulated optical signals.

8. The method of claim 1, wherein the plurality of modulated optical signals are conveyed on respective optical fibers, and wherein the measuring cross-correlations includes:
- splitting each of the respective modulated optical signals of the plurality of modulated optical signals carried on a respective optical fiber into two respective split optical signals conveyed onto two respective further optical fibers, wherein the two respective further optical fibers corresponding to a particular one of the plurality of modulated optical signals are physically oriented into a vertical further optical fiber and a horizontal optical fiber;
- organizing the resulting plurality of vertical further optical fibers and horizontal further optical fibers into respective vertical and horizontal fiber arrays;
- splitting optical output beams of the respective further optical fibers corresponding to the plurality of modulated optical signals into respective numbers of free-propagating beams, wherein respective numbers of free-propagating beams for each of the respective optical output beams are equal to a number of the plurality of modulated optical signals; and
- combining the free-propagating beams corresponding to the vertical fiber array with the free-propagating beams corresponding to the horizontal fiber array to obtain one or more arrays of combined beams.

9. The method of claim 8, wherein the combining the free-propagating beams is performed using a splitter/combiner.

10. The method of claim 8, further comprising detecting the combined beams.

11. The method of claim 1, wherein the computationally processing the cross-correlations to generate an image operates to produce a three-dimensional image.

12. The method of claim 1, wherein optical fibers are used in the conveying the plurality of modulated optical signals.

13. The method of claim 12, wherein the receiving RF radiation, the modulating, the conveying, and the optically measuring cross-correlations comprise a substantially linear operation from the scene to the plurality of measured cross-correlations; and wherein the computationally processing the measured cross-correlations includes approximately inverting the substantially linear operation.

14. A radio-frequency (RF) imaging apparatus, including:
- a plurality of antenna elements arranged in a first pattern and configured to receive RF radiation from a scene and to generate a corresponding plurality of RF signals;
- a plurality of electro-optic modulators corresponding to the plurality of antenna elements, a respective electro-optic modulator configured to modulate an optical carrier with a respective one of the plurality of RF signals to generate a plurality of modulated optical signals;
- a plurality of optical channels configured to carry the plurality of modulated optical signals;
- a plurality of optical-channel outputs;
- a correlation engine optically coupled to the plurality of optical-channel outputs and configured to produce interference among the modulated optical signals;
- a plurality of photodetectors configured to measure cross-correlations among the modulated optical signals by recording the interference among the modulated optical signals;
- a computational processing device configured to generate an image based upon the measured cross-correlations.

15. The imaging apparatus of claim 14, wherein a substantially linear operation from the scene to the measured cross-correlations is effected by a combination of operations that include operations effected by the plurality of antennas, the plurality of electro-optic modulators, the plurality of optical channels, the plurality of optical channel outputs, the correlation engine, and the plurality of photo-detectors; and wherein the computational processing device is configured to include approximately inverting the substantially linear operation.

16. The imaging apparatus of claim 14, wherein the computational processing device is further configured to recover depth information in the scene.

17. The imaging apparatus of claim 14, wherein the correlation engine is configured such that each of the plurality of photo-detectors records the interference among at least two of the modulated optical signals.

18. The imaging apparatus of claim 14, wherein the optical-channel outputs are arranged in a second pattern, wherein the second pattern differs from the first pattern.

19. The imaging apparatus of claim 14, wherein
- the optical-channel outputs are arranged in a second pattern such that the second pattern is a scaled version of the first pattern; and further including
- means to adjust an optical phase in each of the plurality of the optical channels,
- wherein the optical phases are adjusted so that the optical interference pattern differs substantially from the scene or from a low-dimensional representation of the scene, from which the RF radiation is received.

20. The imaging apparatus of claim 14, wherein
- the optical-channel outputs are arranged in a second pattern that is a scaled version of the first pattern; and
- the electro-optic modulators are biased to introduce optical phase differences among the optical channels so that the interference pattern produced in the correlation engine differs substantially from the scene or from a low-dimensional representation of the scene, from which the RF radiation is received.

21. The imaging apparatus of claim 14, wherein each of the plurality of photo-detectors is configured to record the interference between no more than two of the modulated optical signals.

22. The imaging apparatus of claim 14 wherein the optical channels comprise optical fibers.

23. The apparatus of claim 22, wherein the correlation engine comprises:
vertical and horizontal optical fiber arrays formed by splitting each of the respective modulated optical signals of the plurality of modulated optical signals carried on a respective optical fiber into two respective split optical signals conveyed onto two respective further optical fibers, wherein two respective further optical fibers corresponding to a particular one of the plurality of modulated optical signals are physically oriented into a vertical further optical fiber and a horizontal optical fiber that form the vertical and horizontal fiber arrays; and
wherein the correlation engine is configured to split optical output beams of the respective further optical fibers of the vertical and horizontal optical fiber arrays into respective numbers of free-propagating beams, wherein respective numbers of free-propagating beams for each of the respective optical output beams are equal to a number of the plurality of modulated optical signals.

24. The apparatus of claim 23, wherein the correlation engine further comprises:
a beam splitter/combiner configured to combine the free-propagating beams corresponding to the vertical fiber array with the free-propagating beams corresponding to the horizontal fiber array to obtain one or more arrays of combined beams.

25. The apparatus of claim 14, wherein the computational processing device is configured to generate a three-dimensional image based on the measured cross-correlations.

26. A radio-frequency (RF) imaging apparatus, comprising:
a plurality of antennas configured to receiver RF radiation from a scene and generate a plurality of RF signals bearing image information;
a plurality of electro-optic modulators corresponding to the plurality of the antennas and configured to modulate an optical carrier with respective ones of the plurality of RF signals and generate a plurality of modulated optical signals;
a plurality of optical channels to carry the modulated optical signals;
a plurality of photo-detectors optically coupled to the plurality of optical channels and configured so that each photo-detector receives at least a portion of at least two of the plurality of modulated optical signals, whereby the photo-detectors are configured to measure cross-correlations among the modulated optical signals;
a computational processing device configured to generate an image based on the measured cross-correlations.

27. The apparatus of claim 26 wherein
the plurality of antennas, the plurality of modulators, the plurality of optical channels, and the plurality of photo-detectors are configured to implement an approximately linear operation from the scene to the measured cross-correlations; and
the computational processing device is configured to include approximately inverting the approximately linear operation.

28. The imaging apparatus of claim 26, wherein the computational processing device is configured to recover depth information in the scene.

29. The imaging apparatus of claim 26 wherein the plurality of optical channels include optical fibers.

30. An imaging apparatus, including:
means for modulating a plurality of radio-frequency (RF) signals bearing image information onto a corresponding plurality of optical signals to obtain a corresponding plurality of modulated optical signals;
means for obtaining cross-correlations of the plurality of modulated optical signals; and
means for processing the cross-correlations to generate an image.

31. The apparatus of claim 30, wherein the means for processing the cross-correlations comprises means for computing an approximate inverse of an operation performed by the means for obtaining cross-correlations.

* * * * *